United States Patent [19]

Kuwahara et al.

[11] Patent Number: 5,536,456
[45] Date of Patent: Jul. 16, 1996

[54] OPTICAL DISC AND METHOD FOR MAKING

[75] Inventors: Tsuneo Kuwahara; Noriyasu Akashio, both of Saku, Japan

[73] Assignee: TDK Corporation, Tokyo, Japan

[21] Appl. No.: 139,109

[22] Filed: Oct. 21, 1993

Related U.S. Application Data

[63] Continuation of Ser. No. 813,514, Dec. 26, 1991, abandoned.

[30] Foreign Application Priority Data

Dec. 28, 1990 [JP] Japan ..................... 2-418743

[51] Int. Cl.$^6$ .............. B29D 11/00; B29D 17/00
[52] U.S. Cl. .......... 264/1.33; 29/406; 156/73.1; 264/248; 264/328.1; 360/135; 369/282; 425/810
[58] Field of Search ............ 425/810; 264/1.33, 264/248, 106, 107, 328.1; 369/282; 29/406; 360/135; 156/73.1, 272.2

[56] References Cited

U.S. PATENT DOCUMENTS

| | | |
|---|---|---|
| 4,503,531 | 3/1985 | Kato . |
| 4,785,444 | 11/1988 | Nakane et al. . |
| 4,812,345 | 3/1989 | Imai et al. . |
| 4,892,692 | 1/1990 | Takada et al. .......... 264/106 |
| 5,006,058 | 4/1991 | Maruyama et al. . |
| 5,073,313 | 12/1991 | Umemura et al. ......... 264/1.33 |
| 5,102,608 | 4/1992 | Frencken et al. . |
| 5,265,086 | 11/1993 | Ota et al. . |

FOREIGN PATENT DOCUMENTS 3-5111  1/1991  Japan ...................... 425/810

*Primary Examiner*—Mathieu D. Vargot
*Attorney, Agent, or Firm*—Watson Cole Stevens Davis

[57] ABSTRACT

Resin, typically polycarbonate is injection molded into a disc substrate under select conditions, for example, at a mold temperature of 100–160° C., an injection velocity of 100–120 g/sec., and a pressure of 10–60 kg/cm$^2$, such that the birefringence of a radially inner portion of the substrate is higher by about 15–50 nm than the remaining substrate. A center hole is perforated in the substrate and a hub is attached to the substrate around the center hole. At the end of hub attachment, the substrate has a uniform distribution of birefringence over the entire area. Any increase of DC modulation is thus avoided.

7 Claims, 2 Drawing Sheets

OPTICAL DISC AND METHOD FOR MAKING

This application is a continuation application of application Ser. No. 813,514, filed Dec. 26, 1991, now abandoned.

This invention relates to a method for preparing optical discs using injection molded disc substrates, and optical discs.

BACKGROUND OF THE INVENTION

Various optical discs are known in the art including recordable optical discs of the magneto-optical recording and other modes and read-only optical discs such as compact discs. Information is recorded in and reproduced from the optical discs by directing laser light to the recording layer to detect reflected or transmitted light. Since recording and reproducing light often passes through disc substrates, the substrates are required to be transparent to the light.

Additionally, optical discs are characterized by an extremely high density of recording. Then any distortion or dimensional change of substrates can alter recorded signals. Thus the substrates are also required to be durable and low moisture absorptive. Polycarbonate resins satisfy these requirements and are amenable to mass production and thus cost effective. In fact, they have been used for the manufacture of compact discs and magneto-optical recording discs. Polycarbonate resin substrates, however, can sometimes lose optical uniformity due to internal residual stresses.

Since optical discs are generally driven for rotation by magnet clamping means, magnetic hubs must be attached to plastic substrates around their center hole. Particularly when hubs are fusion welded by a ultrasonic Or RF welding technique, internal strains are induced in an inner peripheral portion of the substrates, resulting in increased circumferential variations in DC level of reproduced signals, that is, an increase of DC modulation.

SUMMARY OF THE INVENTION

Therefore, a primary object of the present invention is to provide a method for preparing an optical disc in the form of a disc substrate having a hub attached thereto, which method can offset any strains induced in the disc substrate by attachment of the hub, thus minimizing the DC modulation of reproduced signals. The resulting optical disc is also contemplated herein.

For achieving these and other objects, the present invention provides a method for preparing an optical disc in the form of a disc substrate having a center hole and a hub attached thereto around the center hole.

There is furnished a mold defining a cavity in conformity to the outer configuration of a disc substrate to be molded and having a gate in alignment with the center of the disc substrate. A molten resin is injected into the mold cavity through the gate to mold a disc substrate such that the birefringence of a radially inner portion of the disc substrate is higher by about 15 to 50 nm than the remaining disc substrate. A center hole is configured in the disc substrate. A recording layer is formed on the disc substrate. Finally a hub is attached to the disc substrate around the center hole. Preferably, a pair of disc substrates each having a recording layer thereon are mated such that the recording layers are sealingly enclosed between the substrates, prior to the step of attaching a hub.

Preferably, the disc substrate having the hub attached thereto has a birefringence in the range of 0 nm±20 nm from the inner periphery to the outer periphery.

Preferably, the injection molding step includes reducing the shear stress between the mold cavity surface corresponding to the inner peripheral portion of the disc substrate and the molten resin that comes in contact with the mold cavity surface. This is accomplished by keeping the mold at a temperature of 100° to 120° C. during the injection molding step and/or injecting the molten resin at a maximum injection velocity of 100 to 120 g/sec. and/or a pressure of 10 to 60 kg/cm$^2$.

Also contemplated herein is an optical disc comprising an annular disc substrate having an inner periphery defining a center hole and an outer periphery in which the birefringence of an inner portion of the disc substrate adjacent the inner periphery is larger by about 15 to 50 nm than the remaining disc substrate when it is injection molded; a recording film on the disc substrate; and a hub attached to the disc substrate about the center hole.

According to the method of the invention, a resin of which disc substrates are to be formed, typically polycarbonate, is melted and injected into the mold cavity through the gate at its center to mold a substrate. On injection molding, the resin flows radially outward from the center gate. According to the present invention, a provision is made so as to reduce the shear stress between the radially outward flowing resin and a portion of the mold cavity surface corresponding to the inner periphery of a subsequently perforated disc substrate. This is accomplished by controlling injection molding conditions, particularly by setting the mold temperature at about 100° to 120° C., injecting the molten resin at a maximum injection velocity of about 100 to 120 g/sec., and/or injecting the molten resin under a pressure of about 10 to 60 kg/cm$^2$. The thus injection molded disc substrate in a radially inner portion thereof should have a birefringence which is higher by about 15 to about 50 nm than the birefringence of the remaining disc substrate. A center hole is perforated in the substrate, and a hub is finally attached to the substrate around the center hole. At the end of hub attachment, the substrate has a generally uniform distribution of birefringence over the entire area. This avoids any increase of DC modulation of signals reproduced from the disc.

DETAILED DESCRIPTION OF THE INVENTION

In preparing an optical disc according to the present invention, a mold defining a cavity in conformity to the outer configuration of a disc substrate to be molded is first furnished. Most often, the mold cavity is annular shaped. The mold has a gate in alignment with the center of the disc substrate.

Figure 1A:
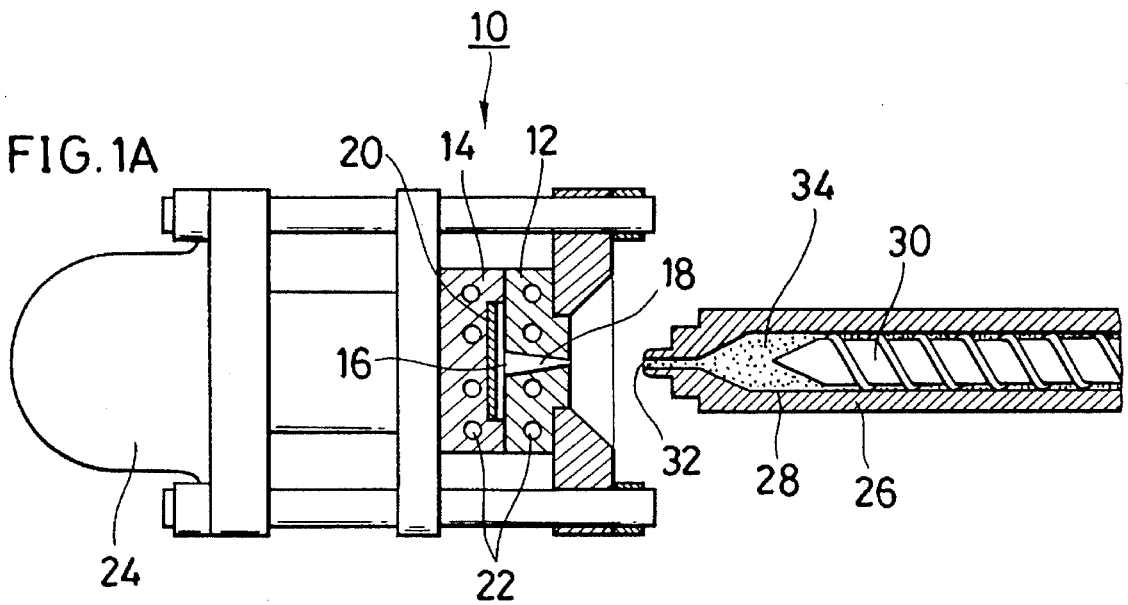
FIGS. 1A, 1B, and 1C illustrate an injection molding process.

Referring to FIG. 1A, there is illustrated an injection molding apparatus 10 including mold halves 12 and 14 defining a cavity 16. One mold half 12 is provided with a gate 18 extending perpendicular to the cavity 16 at the center thereof. A patterned stamper 20 is placed in the other mold half 14. The mold halves 12 and 14 are provided with cooling channels 22. The mold halves 12 and 14 are placed in alignment and urged in close contact by means of a mold clamping cylinder assembly 24. Placed in axial alignment with the gate 18 is a heating barrel 26 which defines a bore 28 in which a screw 30 is received and has a nozzle 32 in flow communication with the bore 28. The bore 28 is charged with a molten resin 34.

Figure 1B:
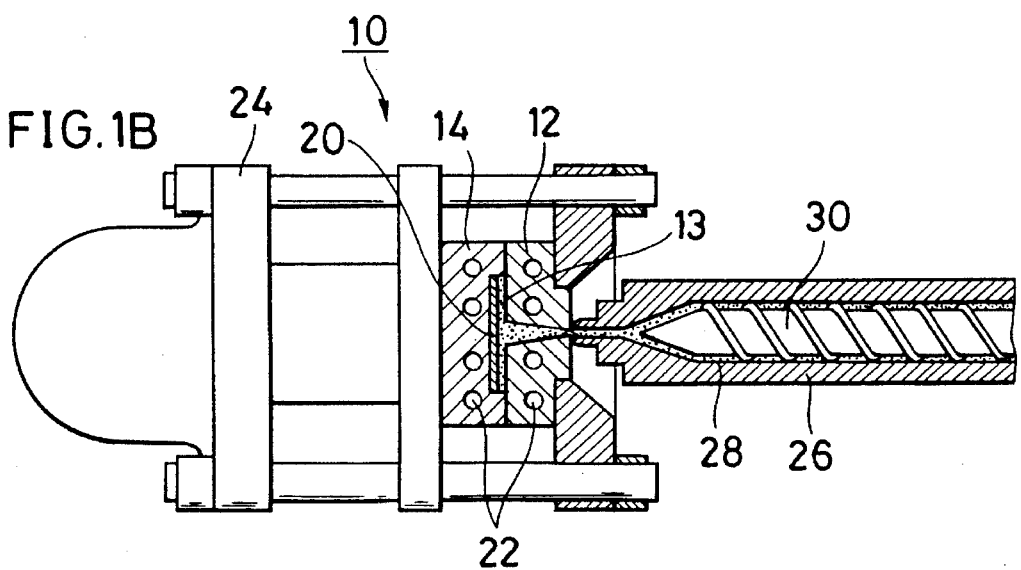

As shown in FIG. 1B, the barrel 26 is moved forward to place the nozzle 32 in communication with the gate 18. The molten resin 34, typically polycarbonate, is injected into the mold cavity 16 through the gate 18 to mold a disc substrate 40.

Preferably, the injection molding conditions including mold temperature, maximum injection velocity, and injection pressure are controlled. (i) The mold temperature may range from about 100° to 120° C., especially from about 105° to 115° C. (ii) The molten resin may be injected at a maximum injection velocity of from about 100 to 120 g/sec., especially from about 105 to 110 g/sec. More particularly, the injection velocity is increased in the range of from 70 to 120 g/sec. in the early stage and then decreased to about 20 g/sec. in the later stage of injection molding. (iii) The molten resin may be injected under a pressure of from about 10 to about 60 kg/cm$^2$, especially from about 10 to about 50 kg/cm$^2$. More particularly, the injection pressure is gradually reduced with the progress of injection molding. It is also possible to apply compression pressure at the end of injection molding. (iv) The cycle time is about 10 to about 30 seconds. (v) The melting temperature is about 320° to about 350° C. for polycarbonate.

Injection molding under such controlled conditions ensures to reduce the shear stress between a radially inner peripheral portion (depicted at 13 in FIG. 1B) of the mold cavity surface (corresponding to the subsequently defined disc substrate inner periphery) and the resin flowing in contact with the radially inner cavity surface portion, resulting in molding of a disc substrate in which the birefringence of the radially inner portion of the disc substrate is higher than the remaining disc substrate. More particularly, the birefringence of the radially inner portion of the disc substrate extending up to 50% of its outer diameter is higher by about 15 to 50 nm than the remaining disc substrate. Preferably, the birefringence of an outer peripheral portion of the disc substrate extending from 75% of its outer diameter to the outer periphery is in the range of from −20 nm to +20 nm.

Figure 1C:
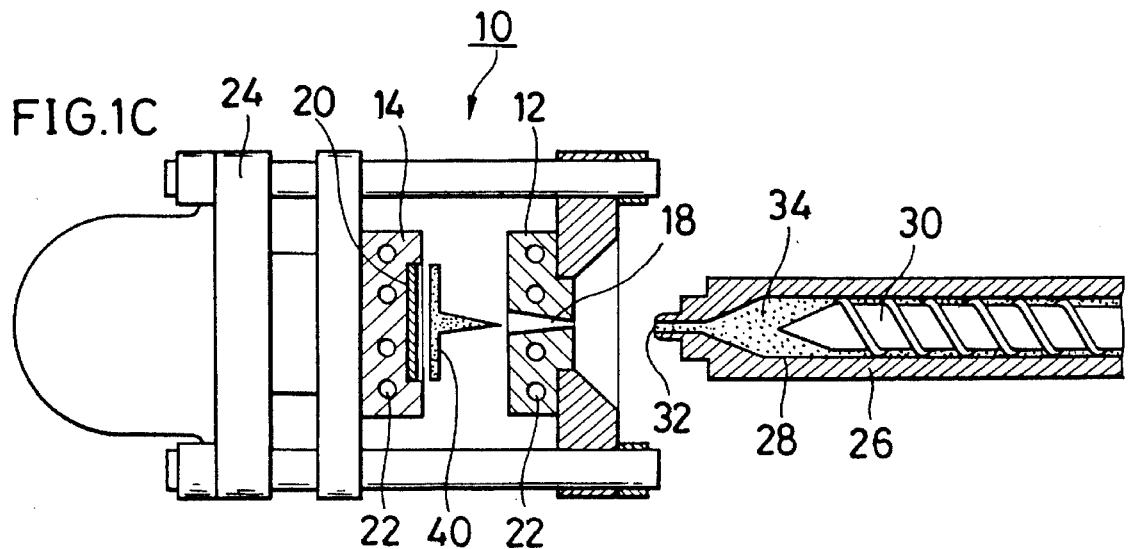

Then the mold clamping cylinder assembly 24 is released to separate the mold halves 12 and 14 as shown in FIG. 1C. The injection molded substrate 40 is taken out. The molded polycarbonate substrate 40 is then perforated with a center hole 42 (see FIG. 2) as by punching and trimmed at the outer periphery, if necessary.

Figure 2:
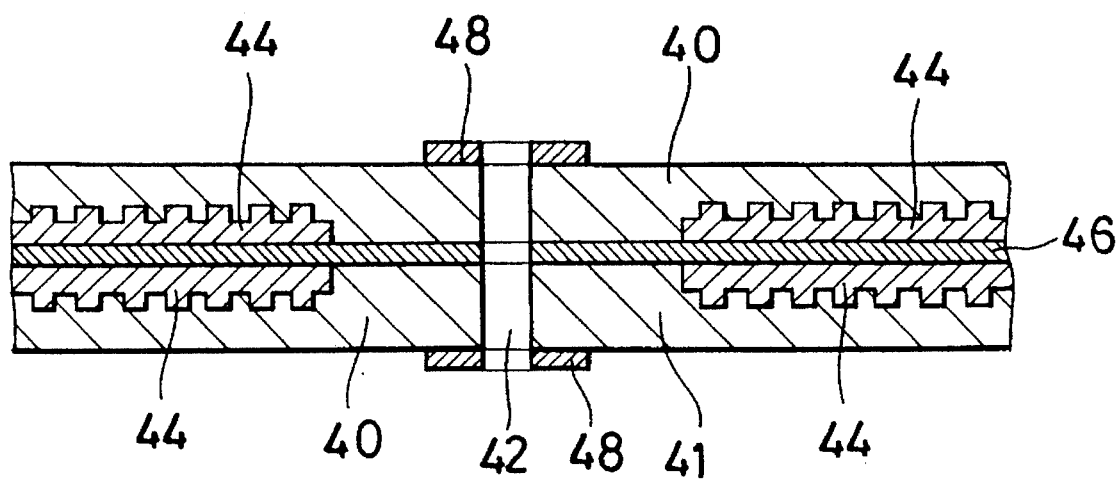
FIG. 2 is a schematic fragmentary cross section of an optical disc according to one embodiment of the invention.

An annular recording film 44 is then formed on one surface of each substrate 40. A pair of polycarbonate substrates 40 having a recording film 44 formed thereon are then joined through an adhesive layer 46 with their center holes 42 aligned such that the recording films 44 face each other. The recording layers 44 are sealingly enclosed within the resulting disc. Then a hub 48 is adhesively secured to the outer surface of each disc substrate 40 along the periphery of the center hole 42. FIG. 2 shows a completed optical disc having a pair of substrates joined together and a pair of hubs attached around the center hole.

The hubs 48 may also be formed of a polycarbonate resin containing magnetic particles. Often, the hubs 48 are secured to the disc substrates 40 by ultrasonic welding. Such bonding causes the birefringence of the inner peripheral portion 41 to lower by about 15 to 40 nm. As a result, the substrate 40 has a generally even distribution of birefringence ranging from −20 nm to +20 nm over the entire area. The hubs 48 may be secured to the disc substrates by any other means. The hubs 48 may be formed of a metal.

EXAMPLE

Examples of the present invention are given below by way of illustration and not by way of limitation.

EXAMPLES 1–3

A polycarbonate composition was injection molded into disc substrates under the conditions reported in Table 1. The disc substrates had an outer diameter of 130 mm and a thickness of 1.2 mm. The injection molded substrates were perforated with a center hole having a diameter of 15 mm.

TABLE 1

| Sample No. | Injection velocity (g/sec) | | Injection pressure (kg/cm$^2$) | Mold temperature (°C.) |
|---|---|---|---|---|
| | Early stage | Later stage | | |
| 1 | 80 → 100 | 100 → 20 | 24 → 12 | 100 |
| 2 | 75 → 95 | 95 → 20 | 30 → 5 | 115 |
| 3 | 75 → 95 | 95 → 20 | 30 → 5 | 100 |

Substrate sample Nos. 1–3 were measured for birefringence using straight beam laser with a wavelength of 633 nm. From the measurements were calculated the average birefringence of an inner annular peripheral portion extending from a radius of 30 mm to 35 mm and the average birefringence of an outer annular peripheral portion extending from a radius of 45 mm to 60 mm. The results are shown in Table 2.

TABLE 2

| Sample No. | Birefringence (nm) after injection molding | | DC Modulation (mV) after hub attachment | |
|---|---|---|---|---|
| | Inner portion | Outer portion | r = 30 mm | r = 60 mm |
| 1 | +25 | +10 | 600 | 300 |
| 2 | +30 | +10 | 500 | 200 |
| 3 | +5 | +5 | 1100 | 300 |

Next, a magneto-optical recording film was deposited on each of substrate sample Nos. 1–3. For each sample, a pair of substrates were aligned and joined together through an adhesive into an integral disc. Magnetic polycarbonate hubs having a thickness of 2 mm and an outer diameter of 25 mm were attached to the upper and lower surfaces of the disc assembly by ultrasonic welding. After hub attachment, the disc sample Nos. 1 and 2 within the scope of the invention showed a birefringence of ±20 nm over the entire area.

The disc samples were measured for DC modulation at positions having a radius of 30 mm and 60 mm. The DC modulation was a reading as voltage value of a DC variation of MO signal on an oscilloscope. The results are shown in Table 2.

As is evident from Table 2, the disc samples within the scope of the invention show significantly reduced DC modulation.

Namely, magneto-optical discs whose substrates are injection molded under select conditions prior to hub attachment show a significant reduction in DC modulation as compared with magneto-optical discs whose substrates are molded under different conditions.

Although hubs are attached to disc substrates by ultrasonic welding in the preferred embodiment, equivalent results are obtained with disc substrates having hubs attached by adhesive bonding and RF fusion welding.

Polycarbonate compositions are used to mold plastic disc substrates in the preferred embodiment since the benefits of the invention become especially enhanced. Other resin compositions, for example, acrylic resins, amorphous polyolefin resins, epoxy resins and styrene resins may be used with comparable results.

Although magneto-optical discs have been described in the preferred embodiments, the present invention is also applicable to any type of optical disc having a hub attached thereto including rewritable, write-once and read-only types.

The present invention is to manufacture an optical disc by controlling the birefringence of an inner peripheral portion of injection molded disc substrates, mating a pair of such substrates, and attaching hubs to the substrates around the periphery of their center hole to complete the disc. As a result, signals reproduced from the disc have reduced DC modulation.

Although the present invention has been described in connection with specific examples and embodiments, it will be understood by those skilled in the art involved that the present invention is capable of modification without departing from its spirit and scope as represented by the appended claims.

We claim:

1. A method for preparing an optical disc in the form of a disc substrate having a center hole, the method comprising the steps of:

preparing a mold defining a cavity in conformity to the outer configuration of the disc substrate and having a gate in alignment with the center of the disc substrate, injecting a molten resin into the mold cavity through the gate to mold the disc substrate such that the birefringence of an outer peripheral portion of the disc substrate extending from 75% of its outer diameter to the outer periphery is in the range of from −20 nm to +20 nm, and the birefringence of an inner peripheral portion of the disc substrate extending up to 50% of its outer diameter is higher by about 15 to 50 nm than the birefringence of said outer peripheral portion, reducing the shear stress between the mold cavity surface corresponding to the inner peripheral portion of the disc substrate and the molten resin that comes in contact with the mold cavity surface, the mold is at a temperature of 100 to 120 degrees C. during the injection molding step, the molten resin is injected at a maximum injection velocity of 100 to 120 g/sec., and the molten resin is injected under a pressure of 10 to 60 kg/cm$^2$, forming an optical recording film on the disc substrate and attaching a hub to the respective outer surfaces of said disc substrate around the center hole so that the birefringence of said inner portion is reduced to provide substantially low uniform birefringence, and the birefringence is in the range from −20 nm to +20 nm from the inner periphery to the outer periphery of the disk substrate.

2. The method of claim 1 wherein the resin is polycarbonate.

3. A method for preparing an optical disc substrate comprising the steps of:

preparing a mold defining a cavity in conformity to the outer configuration of the disc substrate and having a gate in alignment with the center of the disc substrate, injecting a molten resin into the mold cavity through the gate to mold the disc substrate such that the birefringence of an outer peripheral portion of the disc substrate extending from 75% of its outer diameter to the outer periphery is in the range from −20 nm to +20 nm, and the birefringence of an inner peripheral portion of the disc substrate extending up to 50% of its outer diameter is higher by about 15 to 50 nm than the birefringence of said outer peripheral portion, reducing the shear stress between the mold cavity surface corresponding to the inner peripheral portion of the disc substrate and the molten resin that comes in contact with the mold cavity surface, the mold is at a temperature of 100 to 120 degrees C. during the injection molding step, the molten resin is injected at a maximum injection velocity of 100 to 120 g/sec., and the molten resin is injected under a pressure of 10 to 60 kg/cm$^2$, configuring a center hole in the disc substrate, forming an optical recording film on the disc substrate, and attaching a hub to the disc substrate around the center hole so that the birefringence of said inner portion is reduced to provide substantially low uniform birefringence in said disc substrate, and the birefringence is in the range from −20 nm to +20 nm from the inner periphery to the outer periphery of the disc substrate.

4. The method of claim 3, wherein the step of forming a recording film on the disc substrate is performed between the step of configuring a center hole and the step of attaching a hub.

5. The method of claim 4 which further comprises the step of mating a pair of disc substrates each having a recording film thereon such that the recording films are sealingly enclosed between the substrates, prior to the step of attaching a hub.

6. The method according to claim 1, further comprising the step of aligning and joining a pair of the disc substrates into an integral disc, and wherein the step of attaching includes attaching a hub to the respective outer surfaces of said integral disc around the center hole so that the birefringence of the inner portion of said pair of disc substrates is reduced to produce substantially uniform birefringence in the range from +20 nm to −20 nm from the inner periphery to the outer periphery of said pair of disc substrates.

7. The method according to claim 3, further comprising the step of aligning and joining a pair of the optical disc substrates into an integral disc, and wherein the step of attaching includes attaching a hub to the respective outer surfaces of said integral disc around the center hole so that the birefringence of the inner portion of said pair of optical disc substrates is reduced to produce substantially uniform birefringence in the range from +20 nm to −20 nm from the inner periphery to the outer periphery of said pair of disc substrates.

* * * * *